Patented May 20, 1941

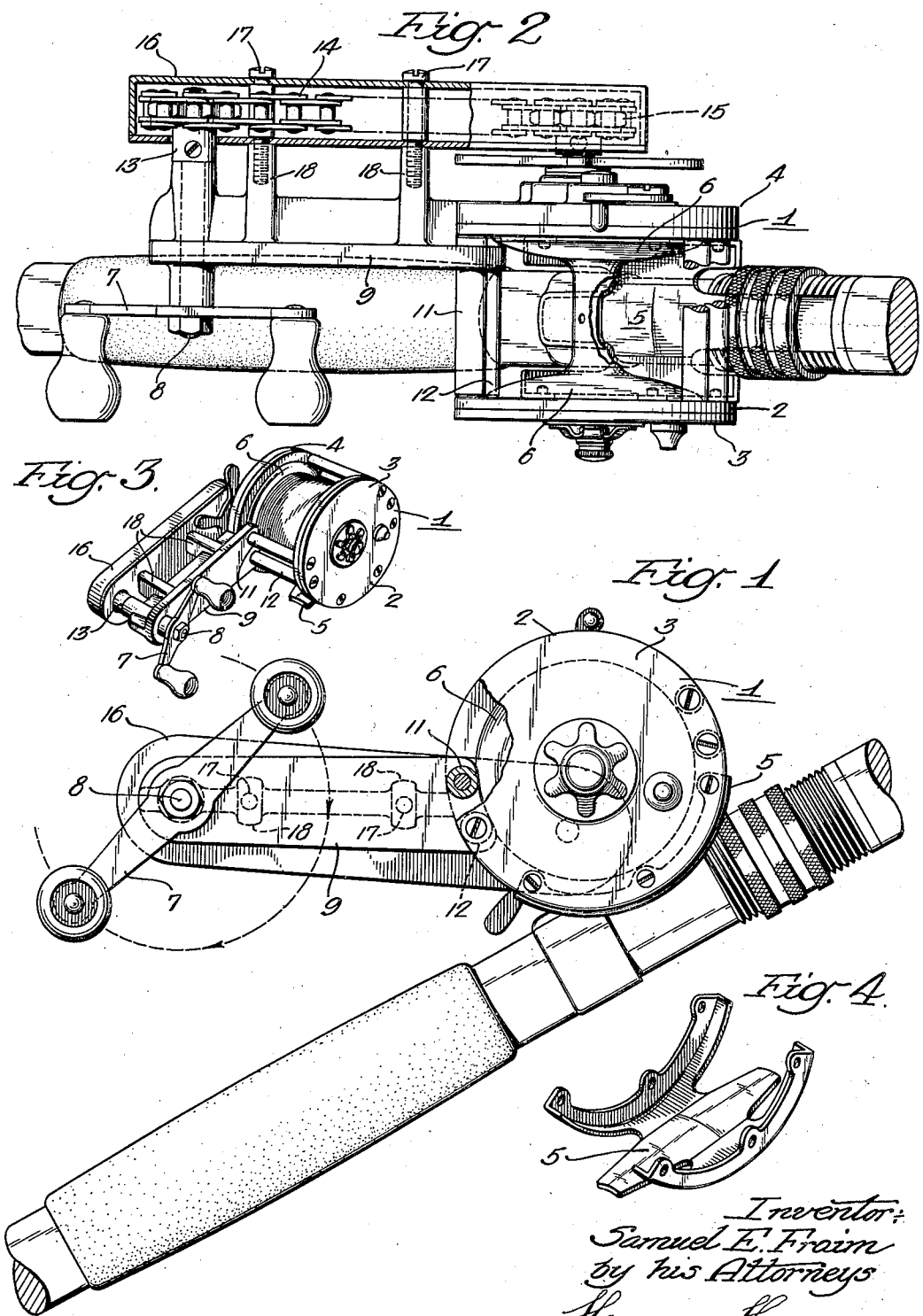

2,242,972

UNITED STATES PATENT OFFICE 2,242,972

FISHING REEL

Samuel E. Fraim, Manor Township, Lancaster County, Pa.

Application May 6, 1939, Serial No. 272,260

3 Claims. (Cl. 242—84.1)

This invention relates to improvements in fishing reels, and the principal object of the invention is to provide a reel of improved construction and operating characteristics.

More specifically, an object of the invention is to provide a reel wherein a novel positional relation of spool and spool lever operates to eliminate substantially all unbalanced and objectionable torque between the reel and the rod to which the reel may be attached. To the ends set forth, the invention contemplates a reel wherein the spool is supported in the conventional centralized position on the rod, and wherein further the spool lever is arranged to operate in a plane which contains the rod axis.

The invention resides further in certain novel structural features hereinafter described and illustrated in the attached drawing, in which:

Figure 1 is a side elevational view of a reel made in accordance with my invention showing a part of a fishing rod to which the reel is attached;

Fig. 2 is a plan and partial sectional view of the reel and the immediately associated portion of the rod;

Fig. 3 is a detached view in perspective of the reel, and

Fig. 4 is a fragmentary view in perspective of the portion of the reel which attaches directly to the rod.

In conventional arrangement, a fishing reel is mounted upon the rod with the spool extending transversely of and centralized with respect to the longitudinal axis of said rod. The spool lever, which normally occupies a position at one end of the spool, is thus located in a position offset transversely from the axis of the rod, with the result that the normal operation of the lever imposes torques tending to twist the rod about its axis in the hands of the operator. This undesirable twisting effect, which is particularly noticeable in the heavier types of equipment, is highly objectionable.

It has been proposed to overcome this fault of the conventional reel assembly by mounting the reel proper on a bracket extending transversely from the rod so as to bring the lever into a position directly above the axis of the rod. While this arrangement theoretically offsets the undesirable effect set forth above, it introduces into the assembly several other unfavorable factors arising from the fact that the entire reel body, together with the spool, is necessarily offset and unbalanced with respect to the rod. In accordance with my invention, the reel is constructed so that in assembly with the rod, the spool occupies the conventional position, while the spool lever is placed in a position transversely removed from the spool axis and intermediate the two planes, normal to said axis, which respectively intersect the ends of the spool and between which the axis of the rod extends. By reason of the reduction in the torque arm resulting from this location of the lever with respect to the rod axis, the objectionable torques referred to above are materially reduced. Ideally the lever is positioned so that it operates in a plane which also includes the rod axis.

In the embodiment of my invention illustrated in the drawing, the body of the reel is designated generally by the reference numeral 1. This body, which includes the frame 2, end plates 3 and 4, seat plate 5, spool 6, and the immediately associated spool-actuating and controlling mechanisms, is entirely conventional in form, with the exception that the entire device is reversed so as to bring the operating shaft, which normally receives the spool lever, to the left end of the frame as in a reel intended for left-hand operation. This reversal does not, however, involve any modification of the normal relation of the spool to the seat plate 5, and in assembly, and as illustrated, the spool occupies the conventional centralized position with respect to the rod axis.

The spool lever, designated by the reference numeral 7, is removed from the operating shaft and is attached instead to a shaft 8 which is journaled in the outer end of a bracket 9 extending rearwardly from the reel body and upwardly at an angle to the plane of the seat plate 5, the bracket 9 in the present instance being secured rigidly to the body 1 through the medium of the frame pillars 11 and 12. The outer end of the shaft 8 carries a sprocket 13 which is connected by a sprocket chain 14 to a sprocket 15 on the exposed end of the reel shaft, to which latter shaft, as previously set forth, the lever 7 is normally attached. In the present instance, the sprockets 13 and 15 and the chain 14 are housed in a casing 16 which is secured by screws 17 to bosses 18 extending transversely from the bracket 9.

By thus disassociating the crank 7 from the body 1 of the reel, it is possible, as shown, to locate the lever in a position directly above the rod, so that the plane in which the lever turns also includes the rod axis. In this position, the forces applied to the lever in operating the reel are exerted in the plane of the rod axis, with the result that unbalanced thrusts tending to twist the rod about said axis are substantially eliminated. At the same time, the device maintains the spool 6 in the conventional advantageous position on the rod.

It will be noted that by reason of the angularity of the bracket 9 with respect to the reel seat plate 5, ample clearance is afforded between the lever 7 and the immediately adjoining portion of the rod, and that the length of the bracket arm 9 is such that ample clearance is afforded also between the crank and the body 1 of the reel.

The reel described above is adapted for right-hand operation, and it is apparent that where left-hand operation is required, the entire structure will be reversed so that the crank 7 may be available to the left hand instead of to the right. It will be apparent further that there may be considerable modification in the structural form and mechanical details of the device without departure from the principle of the invention as defined in the appended claims.

I claim:

1. A fishing reel comprising a spool, a crank arm remote from said spool, transmission mechanism operatively connecting the crank arm with the spool, said arm being arranged for rotation in a plane intersecting, substantially at right angles, the rotary axis of the spool and substantially at the longitudinal center of the latter, and means adapted for mounting the reel in predetermined relative position upon a fishing rod, said mounting means being relatively positioned with respect to the crank arm so that when the reel is mounted upon the rod in said predetermined relative position the longitudinal axis of the rod will lie approximately within the plane of rotation of said crank arm.

2. A fishing reel comprising a spool, a crank arm remote from said spool, transmission mechanism operatively connecting the crank arm with the spool, said arm being arranged for rotation in a plane intersecting, substantially at right angles, the rotary axis of the spool at a point intermediate the ends of the latter, and means adapted for mounting the reel in predetermined relative position upon a fishing rod, said mounting means being relatively positioned with respect to the crank arm so that when the reel is mounted upon the rod in said predetermined relative position the longitudinal axis of the rod will lie approximately within the plane of rotation of said crank arm.

3. A fishing reel comprising a supporting frame having at its forward end a longitudinally extending reel seat for attachment of said frame to a fishing rod, and comprising also an arm extending rearwardly and upwardly from said seat so that in assembly the rear end of said arm is elevated from and relatively remote from the rod, a spool mounted in said frame immediately above and with its rotary axis transverse to the longitudinal axis of said seat, a crank arm journaled in the elevated rear end of said frame arm for rotation in a plane intersecting, substantially at right angles, the said rotary axis of the spool, the said plane of rotation of the crank arm substantially including the longitudinal axes of said seat and rod, and transmission means supported on said frame arm and operatively connecting the crank arm with the spool.

SAMUEL E. FRAIM.